United States Patent [19]
Bell

[11] 3,807,577
[45] Apr. 30, 1974

[54] AERIAL LOAD LIFTING AND TRANSPORTING METHOD AND SYSTEM

[76] Inventor: John L. Bell, Rt. 3, Box 265, Roseburg, Oreg. 97470

[22] Filed: June 12, 1972

[21] Appl. No.: 261,646

[52] U.S. Cl............. 214/1 R, 104/89, 104/173, 212/71, 214/152
[51] Int. Cl............................................. B66c 21/00
[58] Field of Search.......... 104/112, 114, 116, 173, 104/89; 214/1 P, 1 PA, 12, 13, 14, 1 SR, 1 SC, 658, 656, 1 R, 152; 212/71, 72, 25, 27

[56] References Cited
UNITED STATES PATENTS
| | | | |
|---|---|---|---|
| 3,221,897 | 12/1965 | Matheson | 212/71 |
| 3,369,673 | 2/1968 | Mosher | 212/71 |
| 3,260,479 | 7/1966 | Eickmann | 104/22 X |
| 3,346,127 | 10/1967 | Pelton et al. | 212/71 |

FOREIGN PATENTS OR APPLICATIONS
| | | | |
|---|---|---|---|
| 577,034 | 5/1933 | Germany | 214/14 |
| 1,031,022 | 5/1966 | Great Britain | 212/14 |

*Primary Examiner*—Frank E. Werner
*Attorney, Agent, or Firm*—Oliver D. Olson

[57] ABSTRACT

One or more logging chokers or grapples are connected to a butt rigging suspended from a pendulum line supported at its upper end by a balloon fixed in elevated position by guy lines anchored to the ground. The butt rigging is connected to main and haulback lines leading from a yarder, whereby the butt rigging may be swung by the pendulum line between logging and landing sites.

15 Claims, 5 Drawing Figures

PATENTED APR 30 1974 3,807,577
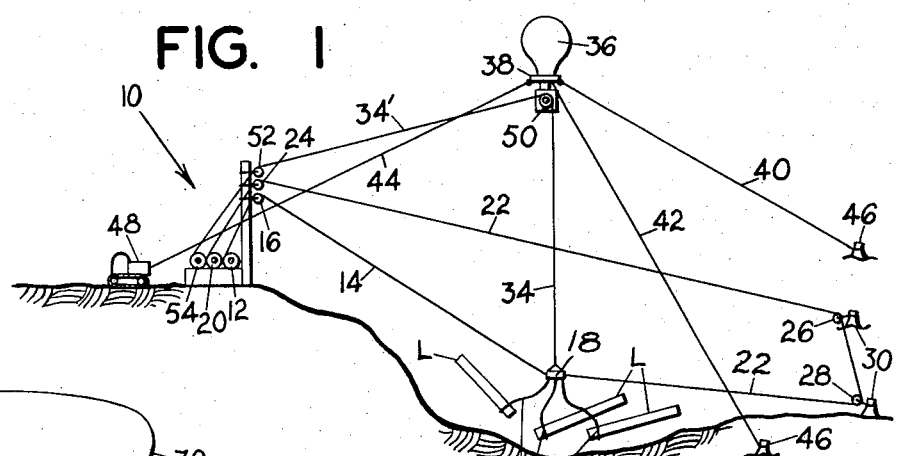
FIG. 1
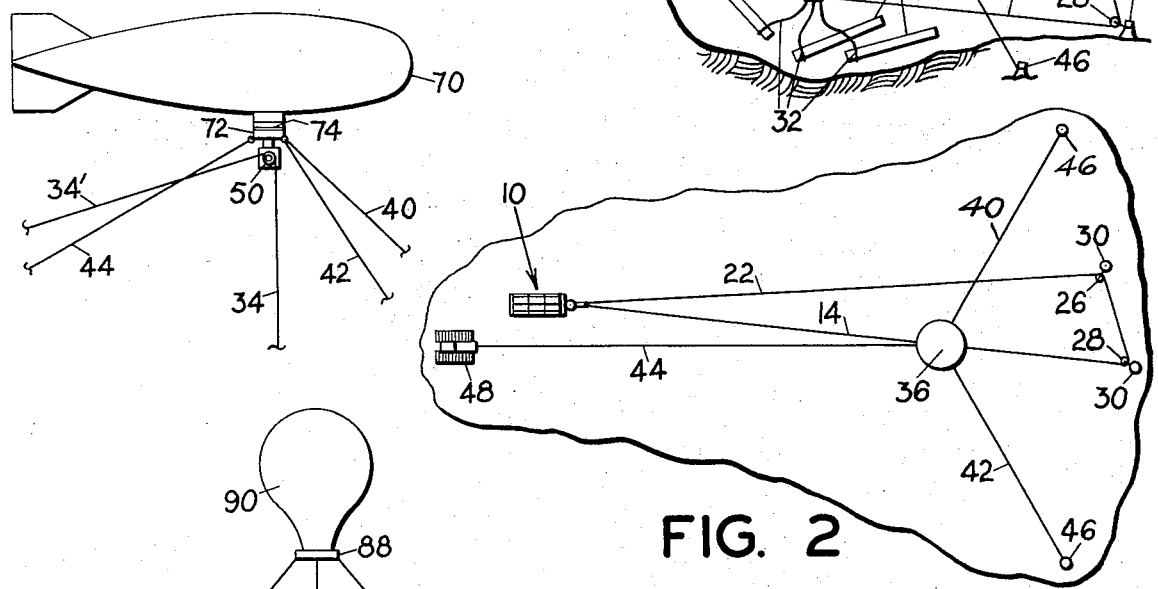
FIG. 2
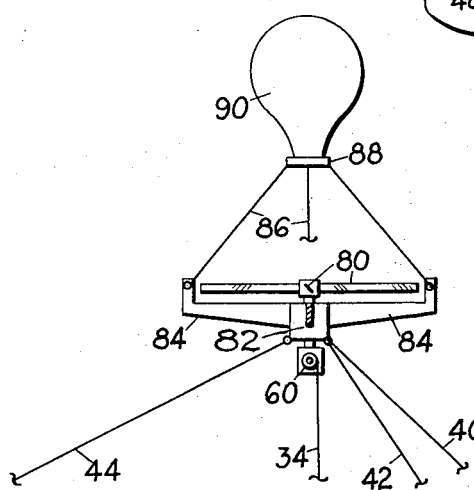
FIG. 4
FIG. 5
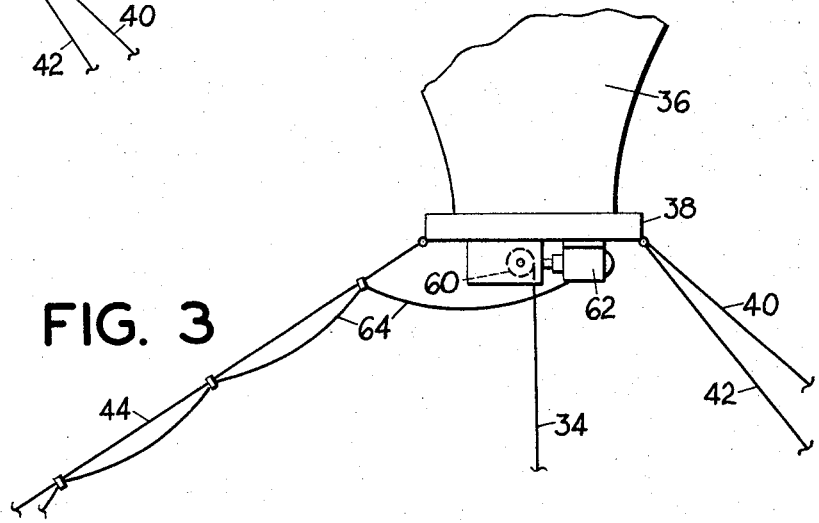
FIG. 3

AERIAL LOAD LIFTING AND TRANSPORTING METHOD AND SYSTEM

BACKGROUND OF THE INVENTION

This invention relates to the transport of loads, and more particularly to a method and system by which a load is raised from a loading site on a pendulum line and swung to a landing site.

Although this invention has utility in a wide variety of applications, such as the transport of cargo and personnel from ship to ship, from ship to shore, and others, it has particular utility in the logging industry and especially in the transport of logs to a landing site across steep and inaccessible areas.

A wide variety of methods and systems have been employed heretofore in the transport of objects from a loading site to a landing site. For example, in the transport of cargo and personnel from ship to ship, or from ship to shore, and in the transport of logs from a logging site to a landing site, a cable is extended between the sites for supporting the load to be transported. In some instances the cable is extended between pulleys or winches for longitudinal movement of the working stretch, with the load secured thereto. In other instances the cable is fixed at its opposite ends for the support of a carriage for movement along the length of the cable. In either case, the system requires substantial power, is subject to excessive wear and thus requires frequent replacement of expensive operating components, and is limited in its application to the transport of objects over relatively even and accessible areas.

The use of helicopters has been attempted by the logging industry for transporting logs from inaccessible areas. However, this procedure has been found to be much too costly to be economically practicable.

The use of lighter-than-air balloons has received considerable experimentation as a source of lifting power for objects to be transported. However, such attempts heretofore have involved the physical movement of the balloon between the loading and landing sites. Because of the massive size necessarily required of such balloons, and their consequent resistance to such movement by air friction, the movement is excessively slow and the power requirements excessively high.

Other methods and systems of logging, such as those employing skidders, drag lines and the like, also suffer from slowness of operation, excessive cost of maintenance and repair, high power requirements and limitations of utility.

SUMMARY OF THE INVENTION

In its basic concept, the method and system of this invention involves the suspension of a load from a pendulum line supported at its upper end from a balloon, or other device capable of providing upward lift, fixed in an elevated position by guy lines anchored to the ground, with main and haulback lines connected to the lower end of the pendulum line for swinging the latter between loading and landing sites.

It is by virtue of the foregoing basic concept that the principal objective of this invention is achieved; namely, to overcome the aforementioned disadvantages of prior load transporting methods and systems.

Another important object of this invention is the provision of a load lifting and transporting method and system which is versatile in its application to the rapid transport of objects at high production rates with a minimum of personnel and a high degree of safety.

A further important object of this invention is the provision of a logging system of high efficiency, easy adjustability for progressive logging of successive areas over uneven and inaccessible terrain, and which may incorporate conventional yarders and others commercially available equipment.

The foregoing and other objects and advantages of this invention will appear from the following detailed description, taken in connection with the accompanying drawing of preferred embodiments.

BRIEF DESCRIPTION OF THE DRAWING

FIG. 1 is a schematic view in side elevation illustrating logging method and system embodying the features of this invention.

FIG. 2 is a fragmentary plan view as viewed from the top in FIG. 1.

FIG. 3 is a fragmentary view in side elevation illustrating a second embodiment of this invention.

FIG. 4 is a fragmentary view in side elevation illustrating a third embodiment of this invention.

FIG. 5 is a fragmentary view in side elevation illustrating a fourth embodiment of this invention.

DESCRIPTION OF THE PREFERRED EMBODIMENT

Referring first to FIGS. 1 and 2 of the drawing, the logging system illustrated schematically therein includes a yarder 10 positioned at a landing site. The yarder includes a powered main line winch 12 from which a main line 14 extends over an elevated pulley 16 and is connected at its free end to a butt rigging 18. The yarder also includes a powered haulback line winch 20 from which a haulback line 22 extends over an elevated pulley 24, thence around tail blocks 26, 28 secured to spaced stumps 30 or other types of anchors in the area of the logging site. The free end of the haulback line is connected to the butt rigging.

One or more choker lines 32 or grapples are connected to the butt rigging and are arranged for engaging logs L to be transported to the landing site. It will be understood that if choker lines are employed, they may be of any desired number and length as required for the effective logging of a predetermined area.

In accordance with this invention, the butt rigging is suspended from a pendulum line 34 which is supported at its upper end by a lighter-than-air balloon 36 which is fixed in an elevated position. In the embodiment illustrated in FIGS. 1 and 2 the balloon is provided with a collar 38 for the attachment of the upper ends of a plurality of spaced guy lines 40, 42 and 44. The lower ends of the guy lines are adapted to be anchored to the ground. In the embodiment illustrated, two of the guy lines 40 and 42 are secured to spaced stumps 46 or other types of anchors in the ground, while the third guy line 44 is anchored to a powered winch on a tractor 48 located adjacent the yarder. By appropriate operation of the winch, or movement of the tractor, the vertical and lateral position of the balloon may be adjusted, within limits, to accommodate desired changes in the logging site.

It will be understood that one or more of the permanent anchors 46 may be replaced with a tractor or other movable anchor, and that all anchors may include a winch by which to vary the length of the guy lines. More than three guy lines and anchors also may be utilized, as desired. All of these variations serve to extend the range and enhance the versatility of the operation of the system.

In the embodiment illustrated in FIGS. 1 and 2, the upper portion of the pendulum line is supported by a pulley 50 mounted on the balloon. The portion 34' of the pendulum line extending laterally from the pulley is trained over an elevated pulley 52 at the yarder and thence is connected to a powered hoisting winch 54 on the yarder. Thus, although the pendulum line 34 and hoisting line 34' may be a single, continuous line, they are designated differently for convenience in identifying their function.

It will be appreciated that the lighter-than-air balloon 36 must have a lifting capacity of several tons in order to accommodate the lifting of a desired number of logs from the ground to a position of elevation from which they may be swung from the loading site to the landing site adjacent the yarder. This operation is achieved by winding in the hoisting line 34' onto the powered winch 54 until the butt rigging 18 and logs have been elevated to a position at which the logs will be clear of the ground as they are swung to the landing site. The powered main line winch 12 and haulback line winch 20 then are operated to draw in the main line and pay out the haulback line simultaneously. The main line thus pulls the butt rigging and the supported logs toward the landing site. The pendulum line 34 swings arcuately about the supporting pulley 50 as its center. Since the balloon remains fixed in its elevated position, the only power required in moving the logs to the landing site is the power required of the main line winch 12 to move the freely suspended logs. Accordingly, the power requirements for the system are maintained at a minimum.

It will be understood that a plurality of smaller balloons may be utilized in place of the single balloon illustrated.

In the embodiment illustrated in FIG. 3, the pendulum line 34 is supported at its upper end on a winch drum 60 supported by the balloon 36. Also supported by the balloon is a source of power for the winch. In the embodiment illustrated, the source of power is an electric motor 62. Although a source of electric supply for the motor also may be mounted on the balloon, the source of supply illustrated is delivered to the motor through flexible electrical conductors 64 which extend from the motor to a source located at the yarder.

Raising and lowering of the pendulum line in the embodiment illustrated in FIG. 3 is achieved by appropriate activation of the motor. In the event the power source for the motor is located at the elevated position of the balloon, suitable remote control for operation of the motor may be provided, in manner well known in the art.

During the swinging of the logs from the loading site to the landing site, it may be found desirable, on occasion, to vary the elevation of the logs in order to carry them freely over hills or other obstructions. This is achieved by appropriate operation of the powered hoisting winch 54 (FIG. 1) or 60 (FIG. 3), as will be understood.

In the embodiment illustrated in FIG. 4, the balloon 70 is of the elongated cigar-shaped type. This type is more responsive to winds and thus changes direction with the winds. Accordingly, the guy line attaching collar 72 is connected to the balloon through a swivel 74. In this manner the balloon is allowed to change direction with the wind without twisting the guy lines.

As in the embodiment illustrated in FIGS. 1 and 2, the embodiment of FIG. 4 illustrates a pulley 50 supported by and extending downward from the collar for supporting the upper portion of the pendulum line 34. In this regard, it will be understood that the powered winch arrangement of FIG. 3 may be utilized in the embodiment of FIG. 4, if desired.

In the embodiment illustrated schematically in FIG. 5 the primary source of lifting power comprises a rotary blade 80 driven by a power source contained in a housing 82 to which the upper ends of the guy lines are attached. This source of power may be an unmanned helicopter, or comparable device, the control of which may be afforded by remote means, or by electrical conductors as in FIG. 3. Supported by the powered rotor is a powered winch 60, as in FIG. 3, for supporting the upper portion of the pendulum line 34.

The powered rotor may be provided with a torque-opposing rotor, in the manner of a conventional helicopter, to prevent undue twisting of the guy lines.

Radial support arms 84 extend from the rotor housing beyond the rotor blade for attachment of the lower ends of the suspension lines 86 the upper ends of which are connected to a collar 88 on a balloon 90. The lifting capacity of the balloon need be sufficient only to support the powered rotor and to maintain the guy lines taut.

Thus, in FIG. 5 the balloon functions to maintain the powered rotor elevated and the guy lines tensioned, when the powered rotor is deactivated, intentionally, or in the event of failure. When a load of logs is elevated above the ground, by winding in the pendulum line 34 on the powered winch 60, the powered rotor 80 is activated to higher rotational speed, commensurate with the weight of the load. The load thus suspended from the pendulum line then may be swung to the landing site by appropriate operation of the main and haulback lines, as previously explained.

The method and system described hereinbefore are adaptable to a wide variety of uses. Thus, for the transport of objects and personnel from ship to ship, massive concrete or other blocks may be submerged to the floor of the body of water to serve as earth anchors for the guy lines which support a balloon in a fixed position at a desired elevation. With the main and haulback lines extending between the ships, or between a ship and the shore, a load to be transported may be suspended from the butt rigging and swung from the loading site to the landing site.

It will be appreciated that an important advantage derives from the suspension of the pendulum line from the fixed position of the elevated balloon; namely, that such a system is completely independent of and therefore unaffected by the random movements of the ships as caused by tides, waves and other movements of the water. Such ship movements affect only the tensioning and slackening of the main and haulback lines, but such changes do not effect the elevation of the load suspended from the pendulum line.

The method and system described hereinbefore accommodates the logging of forest areas across rough or inaccessible terrain. For example, let it be assumed that accessible sites are available for positioning the yarder and the earth anchors in FIG. 1, with an intervening portion of the terrain being inaccessible. The balloon may be stationed in a fixed position of desired elevation for most convenient logging of a desired area, by appropriate adjustment of the guy lines, as previously explained. A load of logs thus may be connected to the butt rigging and suspended above the ground on the pendulum line. By appropriate operation of the main and haulback lines, the load then may be swung across the inaccessible area to the landing site.

An important advantage attending the use of the pendulum line for supporting a load, resides in the requirement of minimum power for swinging the pendulum line between loading and landing sites. For example, referring to FIG. 1 of the drawing, let it be assumed that a load of logs to be transported is located closely adjacent the tail block anchors 30. The butt rigging is swung to that position by drawing in the haulback line and simultaneously paying out the main line. In this position of the butt rigging, the pendulum line is extended obliquely rearward from the supporting pulley 50. Accordingly, when the load of logs is connected to the butt rigging and the latter elevated by drawing the pendulum line upward, as soon as the load of logs is elevated above the ground, gravitational forces act to swing the pendulum line back to the vertical position illustrated in FIG. 1. Thus, the load of logs is moved this distance without the application of external power. As previously mentioned, the remaining distance of swinging movement of the pendulum line, to move the load of logs to the landing site, requires the application of external power sufficient only to swing the freely suspended logs.

It is by virtue of the fact that the logs are elevated above the ground during transport, and thus do not impose ground drag and other frictional resistance to such movement, and by virtue of the fact that the balloon remains stationary in its elevated position and thus is not required to be moved against the resistance of air friction and winds, that the power requirements for the system are minimized and the size of lines also are minimized.

From the foregoing it will be appreciated that the present invention provides simplified and economical method and means by which to lift and transport loads between loading and landing sites with speed and facility, with minimum personnel for operation and maintenance, and with a minimum of power. The method and system of this invention are versatile in application to a wide variety of uses.

It will be apparent to those skilled in the art that various changes may be made in the size, shape, type, number and arrangement of parts described hereinbefore. For example, the balloon may be replaced by any suitable device, such as a helicopter, capable of providing an upward lift, in opposition to the force of gravity, sufficient to tension the guy lines which secure it in fixed, elevated position and to lift the load desired to be transported by swinging of the pendulum line. As another example, the swivel illustrated in FIG. 4 may be utilized in the other illustrated embodiments. These and other changes may be made, as desired, without departing from the spirit of this invention.

Having now described my invention and the manner in which it may be used, I claim:

1. A method of lifting and transporting a load from a loading site to a landing site, comprising
   a. positioning in a fixed, elevated position lifting means providing an upward lift sufficient to support a load to be transported,
   b. supporting a pendulum line from a fixed position relative to the lifting means for vertical movement of the lower end of the line,
   c. connecting a load to the lower end of the pendulum line at a loading site,
   d. elevating the lower end of the pendulum line with the attached load to a position above the earth, and
   e. swinging the pendulum line with attached load to a landing site for deposit of the load.

2. The method of claim 1 including anchoring the lifting means to spaced points on the ground by spaced, longitudinally adjustable guy lines.

3. The method of claim 1 including connecting main and haulback lines to the lower end of the pendulum line for swinging the latter between said loading and landing sites.

4. The method of claim 1 wherein the lifting means comprises a lighter-than-air balloon, and including interposing between the balloon and pendulum line a powered rotor capable of exerting upward lift on the pendulum line.

5. The method of claim 1 for lifting and transporting logs, including
   a. supporting a butt rigging at the lower end of the pendulum line for connection of a log thereto,
   b. extending a main line from the butt rigging to a powered main line winch at a landing site, and
   c. extending a haulback line from the butt rigging to a powered haulback line winch at the landing site through at least one tail block anchored to the earth in the area to the loading site.

6. The method of claim 5 wherein the lifting means comprises a lighter-than-air balloon, and including anchoring the balloon to spaced points on the earth by spaced, longitudinally adjustable guy lines.

7. A system for lifting and transporting a load from a loading site to a landing site, comprising
   a. lifting means capable of providing upward lift sufficient to support a load to be transported,
   b. means for securing the lifting means to the earth in a fixed, elevated position,
   c. a pendulum line,
   d. means supported by and fixed relative to the lifting means for supporting the pendulum line for vertical movement of the lower end thereof,
   e. means on the lower end of the pendulum line for connection of a load to be transported, and
   f. line means connected to the lower end of the pendulum line for swinging the latter between the loading and landing sites.

8. The system of claim 7 wherein the means for securing the lifting means comprises a plurality of spaced guy lines.

9. The system of claim 8 wherein the guy lines are longitudinally adjustable.

10. The system of claim 7 wherein the pendulum line supporting means comprises a pulley supported by the lifting means, the pendulum line extending from the pulley to a powered winch.

11. The system of claim 7 wherein the pendulum line supporting means comprises a powered winch supported by the lifting means.

12. The system of claim 7 wherein the line means comprises main and haulback lines extending between the loading and landing sites.

13. The system of claim 7 for lifting and transporting logs, wherein
 a. the load connecting means comprises butt rigging means on the lower end of the pendulum line,
 b. a yarder is located at a landing site and includes powered main line and haulback line winches, and
 c. the line means comprises main and haulback lines extending between the loading and landing sites and connected to the butt rigging means at one of their ends at their opposite ends to the main and haulback line winches.

14. The system of claim 7 wherein the lifting means comprises a lighter-than-air balloon.

15. The system of claim 14 including a powered rotor interposed between the balloon and pendulum line capable of exerting upward lift on the pendulum line.

* * * * *